United States Patent
Khavari et al.

(10) Patent No.: US 6,616,235 B1
(45) Date of Patent: Sep. 9, 2003

(54) SEAT ASSEMBLY WITH INTEGRAL HEAD/NECK REST

(75) Inventors: Abolfazl Khavari, Tannersville, PA (US); Shirley A. Bonds, Flint, MI (US)

(73) Assignee: World Market, Inc., Tannersville, PA (US)

( * ) Notice: Subject to any disclaimer, the term of this patent is extended or adjusted under 35 U.S.C. 154(b) by 0 days.

(21) Appl. No.: 10/064,162

(22) Filed: Jun. 17, 2002

(51) Int. Cl.7 .................................................. B60N 2/48
(52) U.S. Cl. ........................................ 297/408; 297/410
(58) Field of Search ................................ 297/391, 408, 297/410

(56) References Cited

U.S. PATENT DOCUMENTS

| | | |
|---|---|---|
| 83,227 A | 10/1868 | Warne |
| 344,726 A | 6/1886 | Dolton |
| 444,989 A | 1/1891 | Crispell |
| 2,028,979 A | 1/1936 | Hintz |
| 2,306,334 A | 12/1942 | Costas |
| 2,666,476 A | 1/1954 | Lycan |
| 5,108,150 A | 4/1992 | Stas et al. |
| 5,275,462 A | 1/1994 | Pond et al. |
| 5,308,028 A | 5/1994 | Kornberg |
| 5,364,164 A * | 11/1994 | Kuranami .................. 297/408 |
| 5,531,505 A * | 7/1996 | Baetz et al. ............... 297/408 |
| 5,791,735 A | 8/1998 | Helman |
| 6,120,099 A | 9/2000 | Reikeras et al. |
| 6,129,421 A | 10/2000 | Gilson et al. |
| 6,139,106 A | 10/2000 | Aldridge |
| 6,199,947 B1 | 3/2001 | Wiklund |
| 6,250,716 B1 | 6/2001 | Clough |
| 6,299,254 B1 | 10/2001 | Dinh et al. |
| 2002/0084686 A1 * | 7/2002 | Takata ........................ 297/408 |

FOREIGN PATENT DOCUMENTS

| | | | | |
|---|---|---|---|---|
| EP | 113645 | * | 7/1984 | ................. 297/408 |
| FR | 1579537 | * | 8/1969 | ................. 297/408 |
| GB | 2037154 | * | 7/1980 | ................. 297/408 |

\* cited by examiner

*Primary Examiner*—Peter R. Brown
(74) *Attorney, Agent, or Firm*—John M. Naber; Nancy A. Vashaw

(57) ABSTRACT

A seatback assembly having an integral generally "U" shaped head/neck rest within its seatback that can be configured to accommodate a variety of positions while in use and incorporated into the seatback when not in use. The seat assembly has a seatback attached to a lower seat having a support arch and an opening. A generally "U" shaped head/neck rest is disposed within and pivotally attached to the seatback opening by a pair of mounting bars. The pivotal mount allows an open position for use and a closed position that is integral with the seatback. The mounting bars can be slidably mounted to the seatback and have locking mechanisms. Other features can include an internal frame, a pivotal attachment between the lower seat and seatback and the support arch can be made of tube steel and have padding.

11 Claims, 6 Drawing Sheets

SEAT ASSEMBLY WITH INTEGRAL HEAD/NECK REST

FIELD OF INVENTION

The present invention relates generally to the field of headrests, and in particular to a seat assembly with an integral head/neck rest within the seatback that can be configured to accommodate a variety of positions while in use and incorporated into the seatback when not in use.

BACKGROUND OF INVENTION

Headrests adapted for vehicle seats are well known in the art. Such headrests were originally designed to provide support and comfort to a vehicle occupant. Vehicle seats have evolved through the years for additional functions. A principal function of a current vehicle seat headrest is to prevent the head of an occupant from moving rearward, relative to the torso of the occupant, in the event of a rear impact. Also, a headrest prevents the head of an occupant from moving in an undesirable way when the occupant falls back into the seat after being restrained by a seat belt and/or air bag following a front impact. Accordingly, automotive seatbacks and accompanying headrests have become taller to accommodate safety concerns and government regulations. See generally, U.S. Pat. No. 6,120,099 to Reikeras et al. and U.S. Pat. No. 6,129,421 to Gilson et al.

Unfortunately, many such seatback and headrest assemblies limit rearward occupants forward view, and forward occupants rearward view. Further, current assemblies have limited comfort and adjustment flexibility. These limitations are readily apparent to shorter vehicle occupants. Thus there is a desire and a need in the art to develop a vehicle seatback assembly that not only meets current safety concerns and government regulations, but also meets the vehicle occupant's desire and expectations for comfort and adjustability.

SUMMARY OF INVENTION

Accordingly, the present invention provides an integral head/neck rest within its seatback that can be configured to accommodate a variety of positions while in use, and incorporated into the seatback when not in use.

In one embodiment, the seat assembly has a seatback attached to a lower seat having a support arch and an opening. A generally "U" shaped head/neck rest is disposed within and pivotally attached to the seatback opening by a pair of mounting bars. The pivotal mount allows an open position for use and a closed position that is integral with the seatback.

In alternate embodiments, the mounting bars can be slidably mounted to the seatback and have locking mechanisms.

Other features are possible using the present invention. The seat can have an internal frame. The attachment between the lower seat and the seatback can be pivotal. The support arch can be made of tube steel and have padding. The pivotal attachment between the mounting bars and the head/neck rest can have a frictional engagement.

Other features and advantages of the present invention will become more apparent to persons having ordinary skill in the art to which the present invention pertains from the following description taken in conjunction with the accompanying figures.

BRIEF DESCRIPTION OF DRAWINGS

The foregoing advantages and features, as well as other advantages and features, will become apparent with reference to the description and figures below, in which like numerals represent like elements and in which.

DETAILED DESCRIPTION

Figure 1:
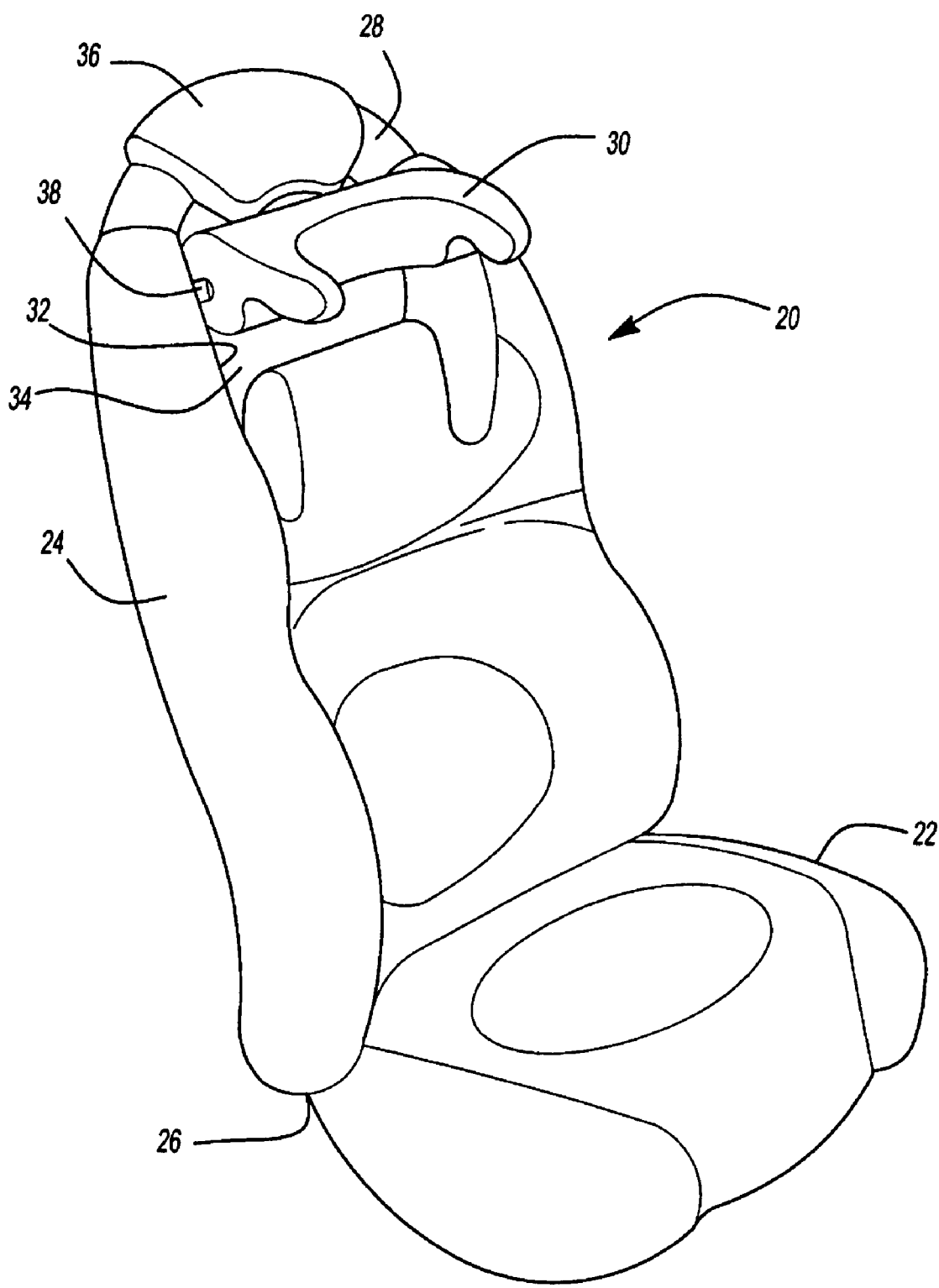
FIG. 1 illustrates a perspective view of a seat assembly in accordance with an embodiment of the present invention with the head/neck rest in an open position.

The present invention generally involves the field of vehicle seat assemblies having headrests. The seat assembly of the present invention allows for a tall seatback while also providing an adjustable and retractable head/neck rest. FIG. 1 shows a seat assembly 20 in accordance with one embodiment of the present invention. The seat assembly 20 can have an internal support frame 44 as is partially shown in FIGS. 3 and 4 and use various types of upholstery and cushioning materials that are well known in the art to cover the internal frame.

Specifically, the seat assembly 20 includes a lower seat 22 with a seatback assembly 24 and can be fixedly attached or pivotally attached thereto at pivot 26. The seatback assembly 24 has a support arch 28 and an internal periphery 32 that defines a seatback opening 34. The support arch 28 can be made from a variety of materials such as tube steel or any other materials to provide support. Arch padding 36 can also be added including any of a variety of cushioning material known in the art covered by a durable covering or upholstery.

Figure 2:
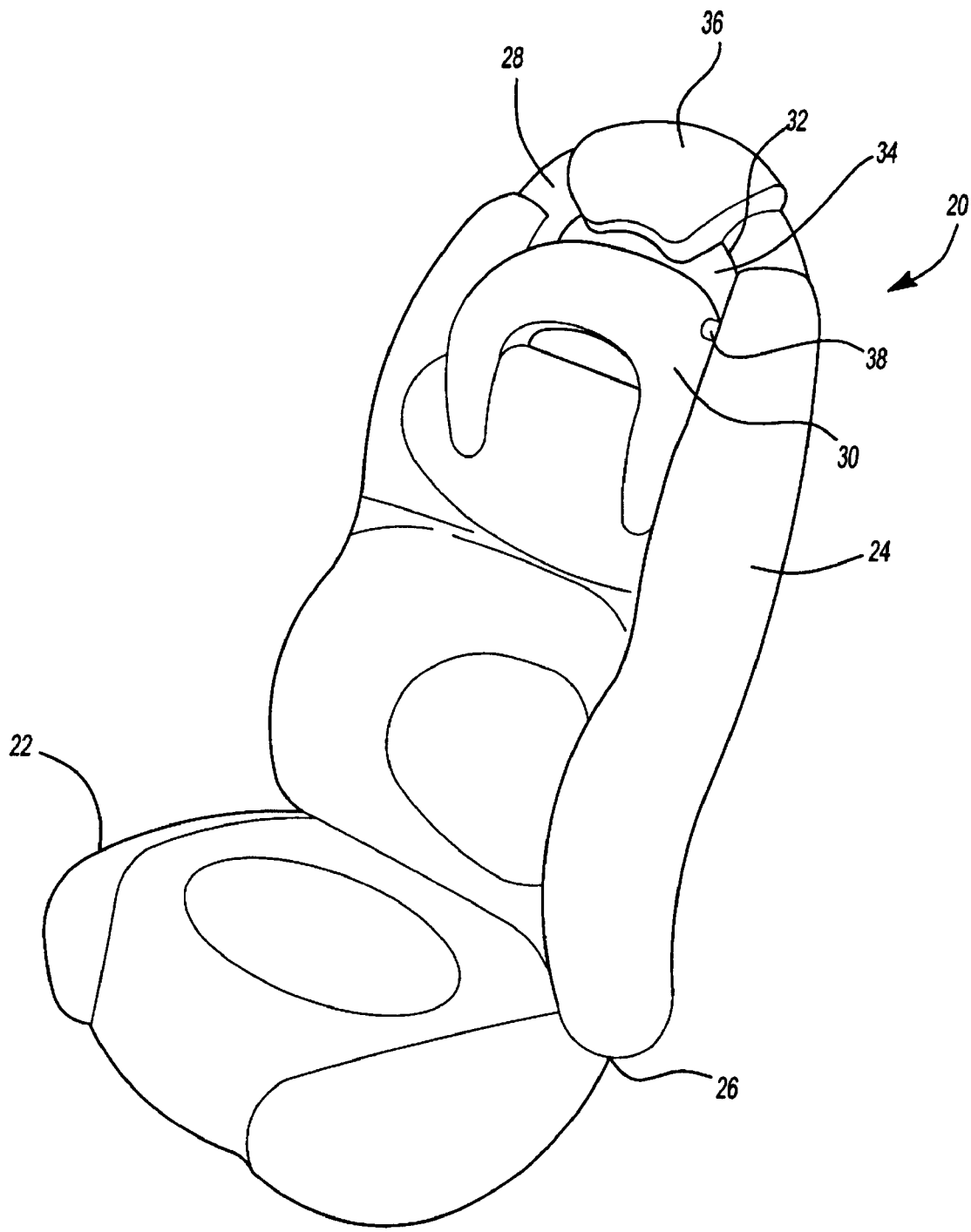
FIG. 2 illustrates a perspective view of a seat assembly in accordance with an embodiment of the present invention with the head/neck rest in a closed position.
Figure 3:
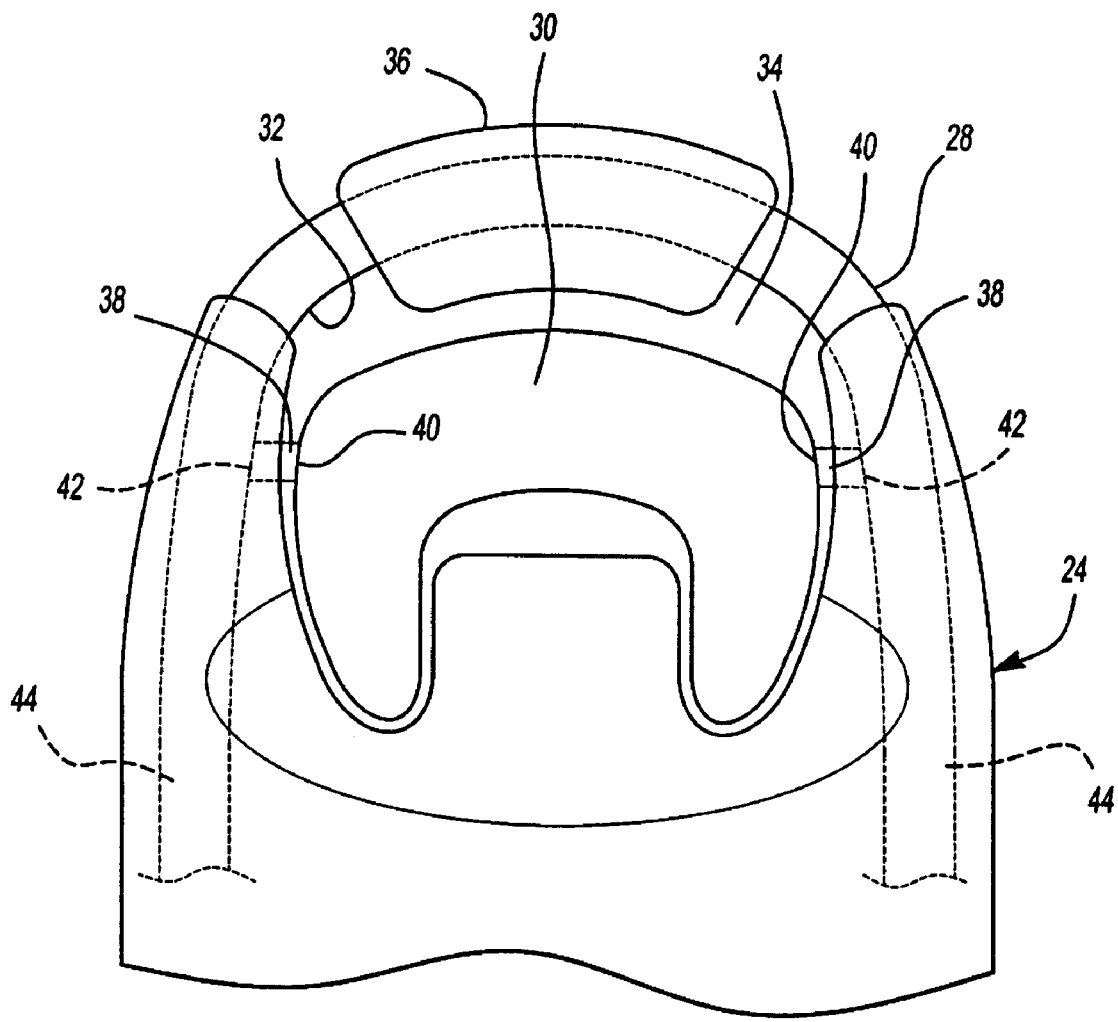
FIG. 3 illustrates a front view of a head/neck rest in accordance with an embodiment of the present invention in a closed position.
Figure 4:
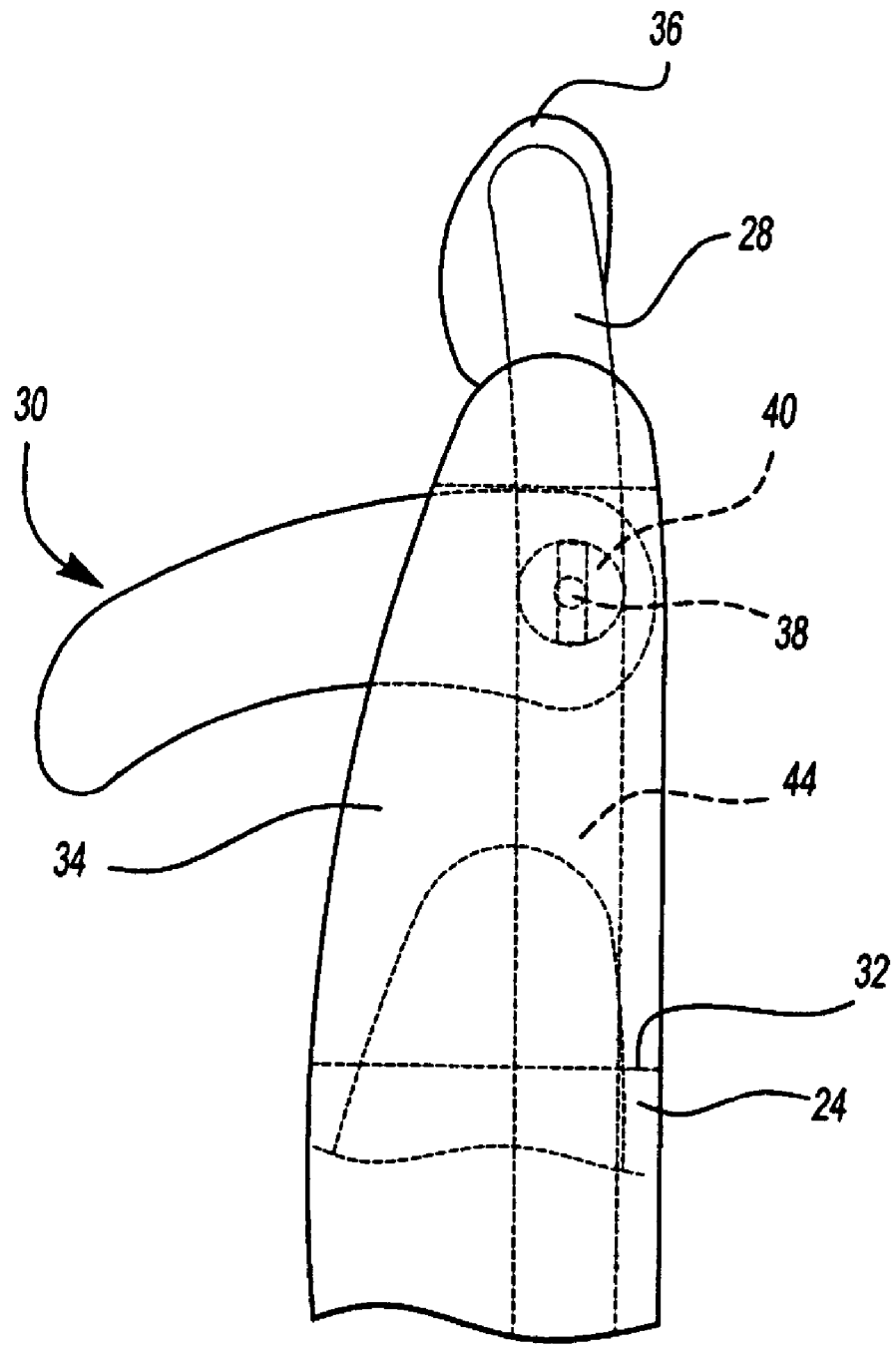
FIG. 4 illustrates a side view of a head/neck rest in accordance with an embodiment of the present invention in an open position.

A head/neck rest assembly (headrest) 30, generally configured in a "U" shape to support the head and neck of an occupant, can be attached at 42 to the seatback assembly 24 and disposed within the seatback opening 34 by two mounting bars 38. The mounting bars 38 are pivotally attached to the headrest 30 at pivotal mount 40 to allow headrest 30 movements from an open position for use as illustrated in FIGS. 1 and 4 to a closed position as illustrated in FIGS. 2 and 3. The headrest 30 can be held in place by a frictional engagement between the mounting bars 38 and headrest 30 so that the occupant may adjust the headrest 30 by manually grasping the headrest 30 and applying an appropriate force to overcome the friction. This type of frictional engagement is well known in the art. As illustrated in FIG. 2 and 3, in the closed position, the headrest 30 becomes integral with the seatback assembly 24.

Figure 5:
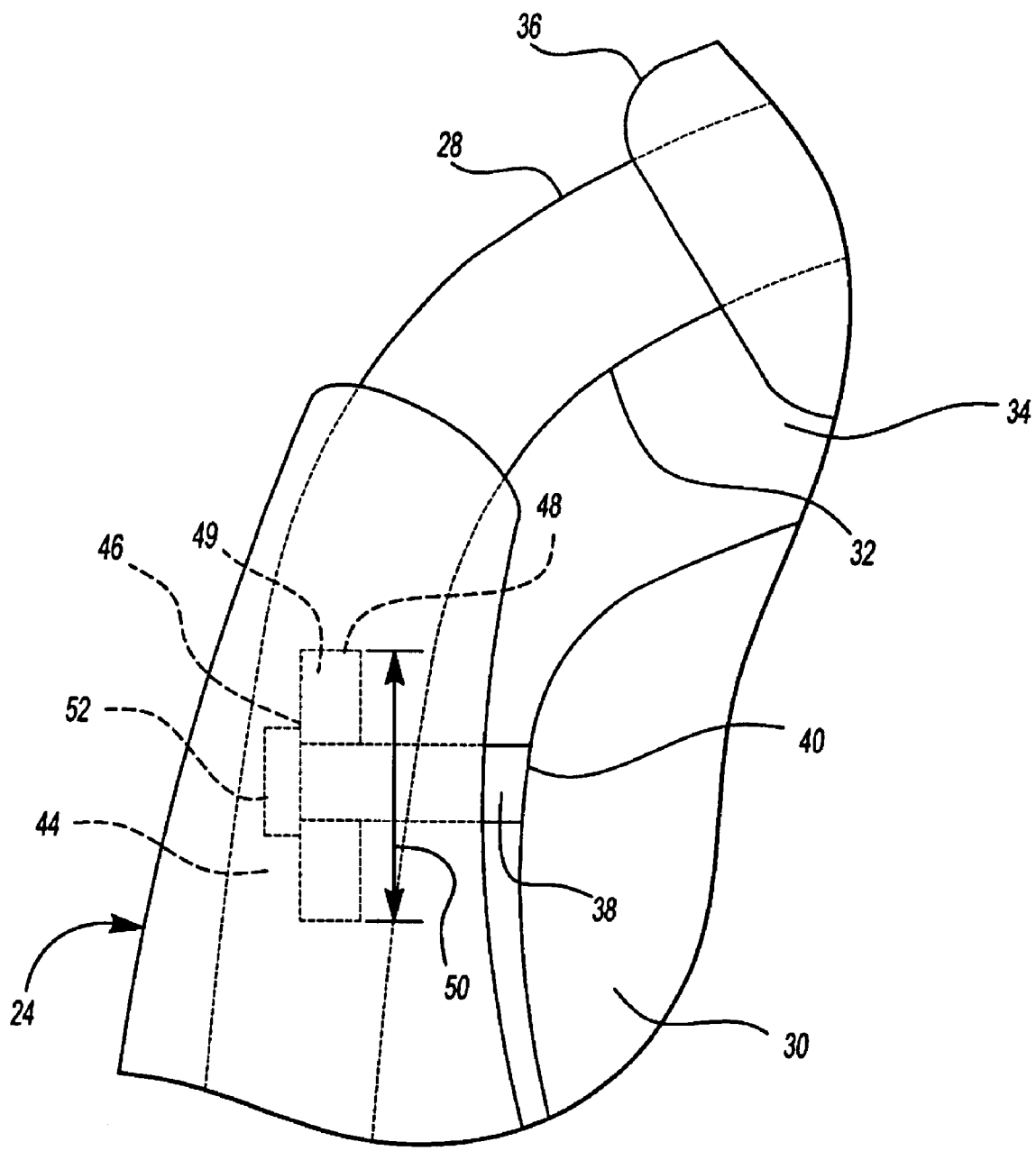
FIG. 5 illustrates a front view of a head/neck rest assembly in accordance with an embodiment of the present invention that allows vertical adjustment of the headrest.

In an alternate embodiment of the present invention, illustrated in FIG. 5, the mounting bars 38 may also be slidably mounted to the seatback assembly 24 to allow the headrest 30 to be vertically adjustable. By way of example only, this slidable mount 46 can include vertical slots 48 along the internal periphery 32 of the seatback assembly 24 to define a range of vertical adjustment 50 for the headrest 30 that can be several centimeters. The mounting bar 38 is configured to extend into and through the vertical slot 48 having a vertical slot channel 49. The mounting bar 38 can maintain a static position within the vertical slot 48 through many means known in the art such as a frictional engagement. Lateral movement of the headrest 30 can be limited by placing a flange or rim (rim) 52 at the end of the mounting bars 38. Other means to limit lateral movement are possible and known in the art. In the embodiment of the present invention illustrated in FIG. 5, the headrest 30 can be adjusted vertically by manually grasping the headrest 30 and applying an appropriate force, causing the mounting bars 38 to slide along the vertical slot 48.

Figure 6:
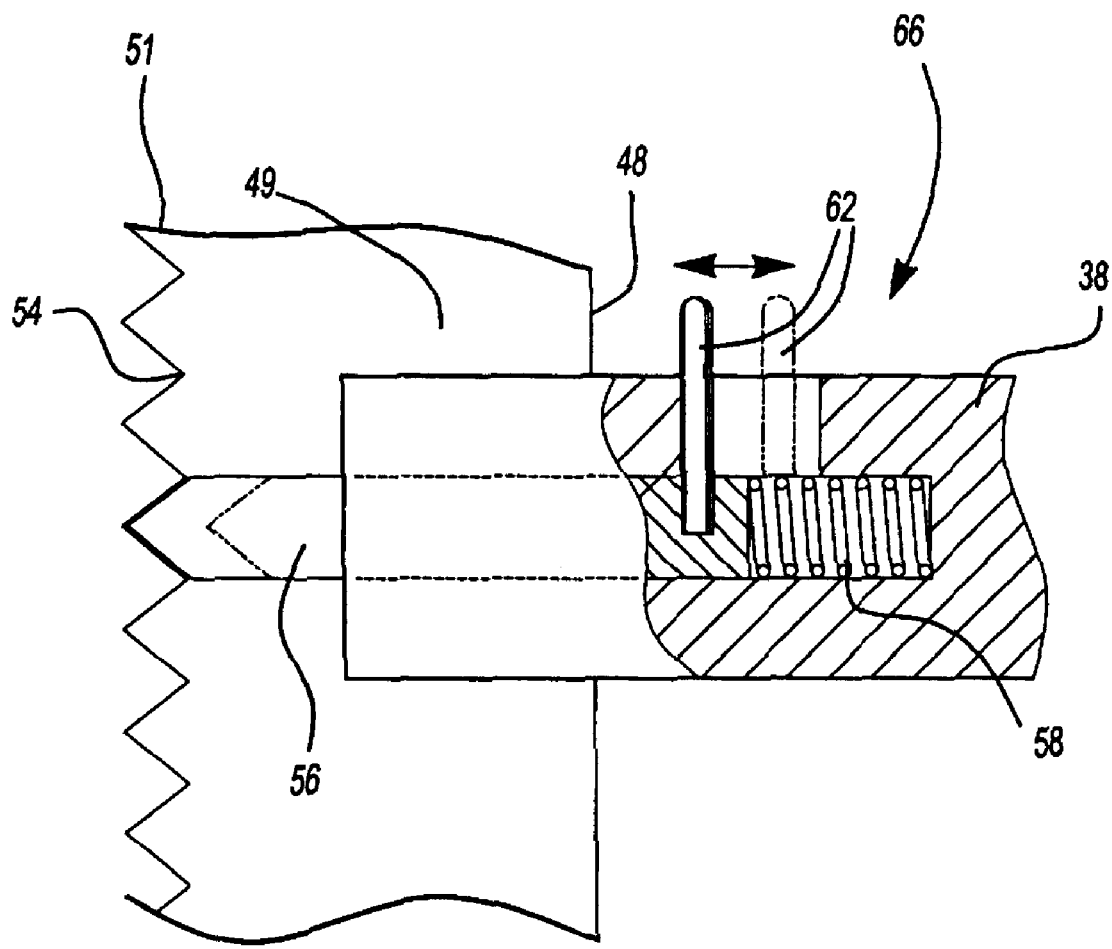
FIG. 6 illustrates a front cross-sectional view of a vertical slot having an adjustment locking mechanism in accordance with an embodiment of the present invention.

FIG. 6 illustrates an alternate embodiment of the present invention. In this embodiment, a locking mechanism assembly generally indicated at 66 is added to automatically lock the vertical adjustment of the headrest 30 within the vertical slot 48. As illustrated in FIG. 6, the vertical slot channel 49 has vertical edges that can comprise teeth 54. The teeth 54 can be arrayed on a back edge 51 of the vertical slot channel 49. The teeth 54 would be configured to be engageable with a lock pin 56 disposed within a bore 60 of the mounting bar or bars 38 that is biased toward the teeth 54 by a spring 58. Accordingly, the bias of the spring 58 causes lock pin 56 to automatically force itself into the teeth 54, thereby positively locking the headrest 30 into a desired vertical position.

In the embodiment of the present invention illustrated in FIG. 6, the occupant may also release the lock pin 56 against the teeth 54. A release lever 62 attached to the lock pin 56 is guided in a channel 64 within the mounting bars 38. The occupant may release the lock pin 56 by providing a force sufficient to overcome the spring 58 bias, thereby pulling the lock pin 56 away from the teeth 54, and releasing the headrest 30 for vertical movement within the vertical slot 48.

Thus, the extended and vertically adjusted headrest 30 provides a substantial degree of comfort to an occupant who wishes to use the headrest 30 as a support for the head and/or neck, irrespective of their height within the seat assembly 20. Further, when the headrest 30 is in an extended position, front-to-back and back-to-front visibility is improved. In a retracted position, the headrest 30 becomes part of the seatback assembly 24.

Alternate embodiments could add motorized adjustments as are known in the art.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention, as defined in the appended claims.

What is claimed is:

1. A seatback assembly, comprising:
   a seatback having a support arch and an internal periphery that defines a seatback opening; and
   a head/neck rest assembly connected to said seatback, said head/neck rest assembly comprising at least one mounting bar, and a generally "U" shaped head/neck rest connected to said at least one mounting bar, said at least one mounting bar connected to said seatback to provide a pivotal mounting between said head/neck rest and said seatback, wherein said head/neck rest is pivotable between an open position in which it is disposed substantially out of said seatback opening and a closed position in which it is accommodated substantially within said seatback opening.

2. The seatback assembly of claim 1, wherein said support arch forms part of an internal frame of said seatback.

3. The seatback assembly of claim 2, further comprising upholstery and cushioning materials covering said internal frame.

4. The seatback assembly of claim 1 further comprising a lower seat pivotally attached to said seatback.

5. The seatback assembly of claim 1, wherein said support arch is made of tube steel.

6. The seatback assembly of claim 1, wherein said support arch further comprises padding.

7. The seatback assembly of claim 1, wherein said support arch defines a top of said seatback assembly and said head/neck rest assembly in said open position does not extend above said top of said support arch.

8. A seatback assembly, comprising:
   a support arch and an internal periphery that defines a seatback opening;
   a head/neck rest assembly connected to and disposed within said seatback, opening, said head/neck rest assembly comprising a pair of mounting bars, and a generally "U" shaped head/neck rest pivotally attached relative to said mounting bars between an open position for use and a closed position that is integral with the seatback; and
   wherein said mounting bars are slidably mounted to said seatback.

9. The seatback assembly of claim 8, wherein said slidable mount comprises vertical slots having a vertical slot channel along said internal periphery and said mounting bars extend into and through said vertical slot channel.

10. The seatback assembly of claim 8, wherein said slidable mount further comprises a locking mechanism.

11. The seatback assembly of claim 10, wherein said locking mechanism comprises an array of teeth along a back edge of said vertical slot channel, and said mounting bar further comprising a lock pin disposed within a bore spring biased toward said teeth and a release lever attached to said lock pin guided in a channel within said mounting bar.

\* \* \* \* \*